May 10, 1955 M. R. CLARK 2,708,148
CAMERA TIMER
Filed Feb. 4, 1952 3 Sheets-Sheet 1

INVENTOR.
MAURICE R. CLARK
BY
Ellsworth R. Roston
ATTORNEY

May 10, 1955    M. R. CLARK    2,708,148
CAMERA TIMER

Filed Feb. 4, 1952    3 Sheets-Sheet 2

INVENTOR.
MAURICE R. CLARK
BY
Ellsworth R. Roston
ATTORNEY

May 10, 1955  M. R. CLARK  2,708,148
CAMERA TIMER
Filed Feb. 4, 1952  3 Sheets-Sheet 3
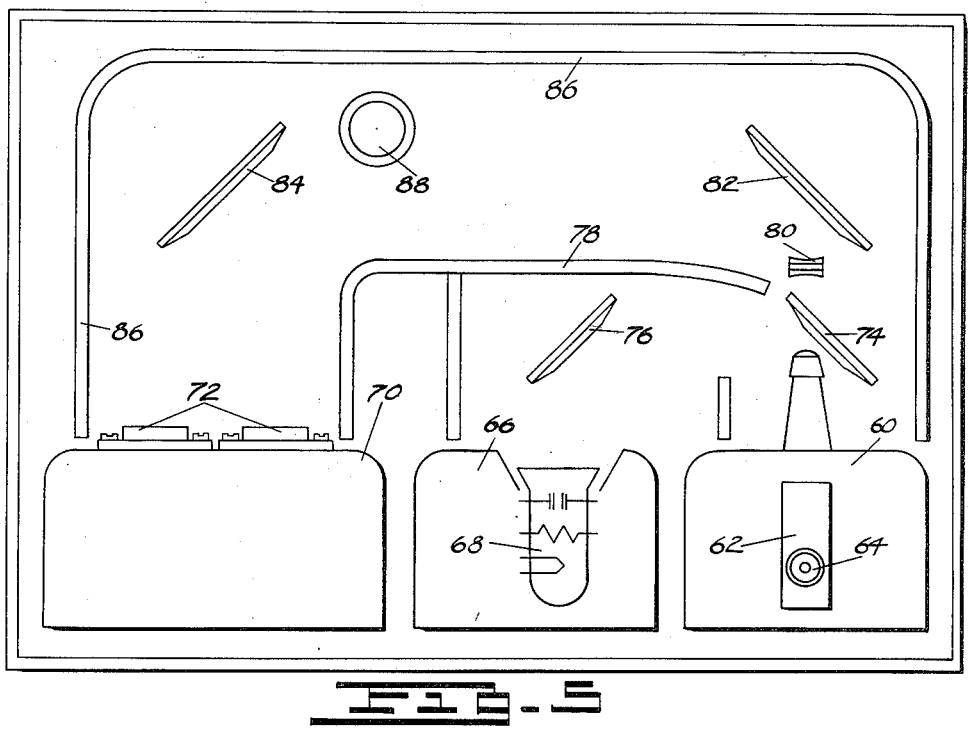
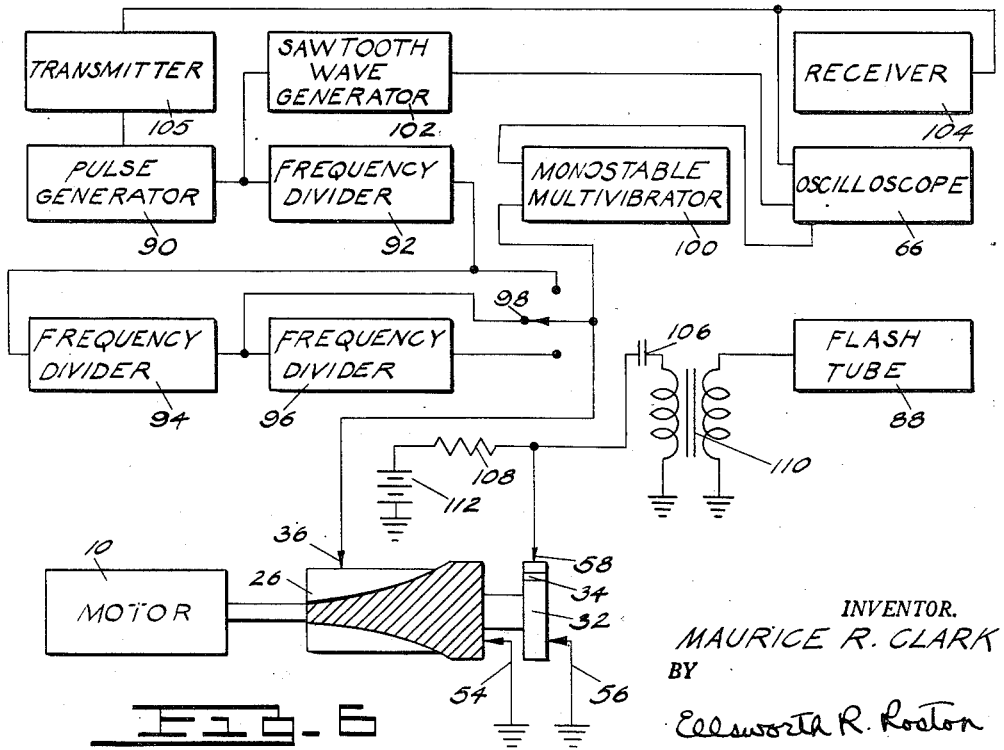
INVENTOR.
MAURICE R. CLARK
BY
Ellsworth R. Roston
ATTORNEY

United States Patent Office 2,708,148
Patented May 10, 1955

2,708,148

CAMERA TIMER

Maurice R. Clark, Detroit, Mich., assignor, by mesne assignments, to the United States of America as represented by the United States Atomic Energy Commission Application February 4, 1952, Serial No. 269,877

15 Claims. (Cl. 346—107)

This invention relates to a timer for a camera and more particularly to a timer for synchronizing the photographing of a phenomenon and the photographing of other information related to the phenomenon.

In many electronic applications, pulses of energy are radiated to a distant object from a transmitter at a central station and are reflected by the distant object back to a receiver at the central station. The transmitted and received pulses are then utilized at the central station to obtain different information, such as the distance between the central station and the distant object. One way in which the transmitted and received pulses may be utilized is by a comparison of their wave shapes on an oscilloscope. At the same time, instrument readings may be obtained of such parameters as the peak power in the pulse and the temperature and humidity of the atmosphere, all of which may affect the performance of the equipment at the central station.

It is often desirable to make, for future study, a permanent record of the different information obtained at the central station. For example, a permanent record of the pulse wave shapes as seen on an oscilloscope and of the other parameters affecting the performance of the equipment at the central station may be obtained. Since the wave shape of the pulses may vary faster than such parameters as atmospheric temperature and pressure, it may be desired to obtain a number of wave shape pictures before a picture of the instrument readings relating to the different parameters is taken. While a picture relating to the different parameters is being taken, the oscilloscope sweep should be cut off to prevent any light from the oscilloscope beam from impairing the pictures of the related parameters, so that a good photographic record of the parameters will be insured.

Until now, a satisfactory apparatus has not existed for presenting a phenomenon, such as wave shapes on an oscilloscope, for photography at a predetermined rate and for blanking out any effects of the phenomenon every time that a picture is taken of the different parameters bearing upon the phenomenon. Nor has apparatus existed in which the rate at which pictures taken of the other parameters may be adjusted relative to the rate at which the phenomenon itself is presented for photography. This invention provides such apparatus in a simple and reliable form.

An object of this invention is to provide a camera timer for adjusting the rate at which a phenomenon is presented for photography.

Another object of the invention is to provide a camera timer of the above character for presenting other parameters related to the phenomenon for photography after a predetermined number of pictures have been successively taken of the phenomenon.

A further object is to provide a camera timer of the above character for adjustably synchronizing the rate at which pictures are taken of a phenomenon relative to the rate at which pictures are taken of other parameters related to the phenomenon.

Still another object is to provide a camera timer of the above character for blanking out any effects of the phenomenon at the time that a photograph is being taken of the parameters related to the phenomenon.

A still further object is to provide simple, sturdy and reliable apparatus of the above character.

Other objects and advantages will be apparent from a detailed description of the invention and from the appended drawings and claims.

In the drawings:

Figure 1 is a front elevational view of a camera timer;

Figures 2 and 3 are sectional views substantially on the lines 2—2 and 3—3 of Figure 1;

Figure 5 is a schematic diagram illustrating the disposition of apparatus associated with the camera timer shown in the previous figures; and Figure 6 is a circuit diagram, partly in block form, of the camera timer shown in Figures 1 to 4, inclusive, and the associated apparatus shown in Figure 5.

Figure 1:
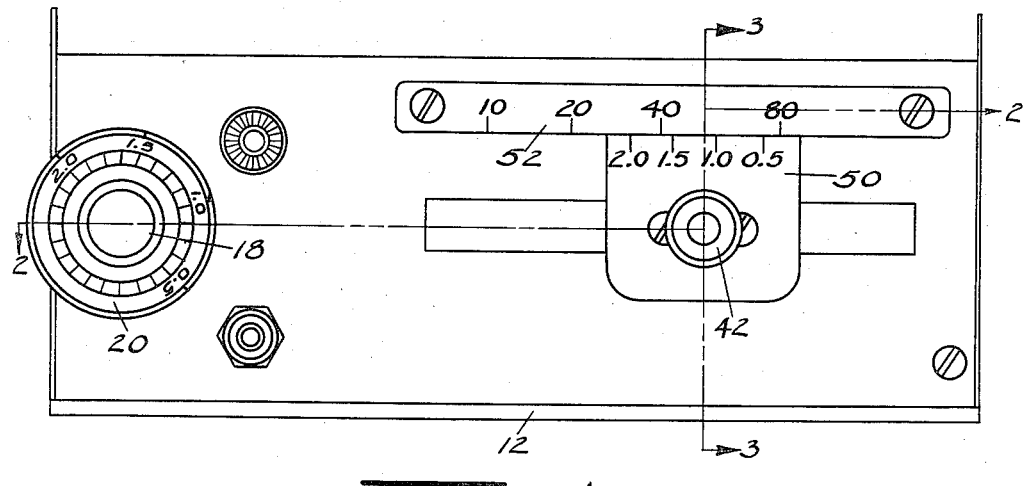

In one embodiment of the invention, a suitable motor 10 (Figure 2), such as a shunt motor, is secured to a casing 12 as by brackets 14. A potentiometer 16 having a shaft rotatable by the manual operation of a knob 18 is also suitably secured to the casing and is electrically connected to the motor 10 to vary the speed of the motor by the rotation of the knob. A dial 20 (Figure 1) is provided partially around the perimeter of the potentiometer 16 in front of the casing 12 to provide an indication of the motor speeds at the different settings of the potentiometer. A fuse clip 22 is also mounted on the casing 12.

Figure 2:
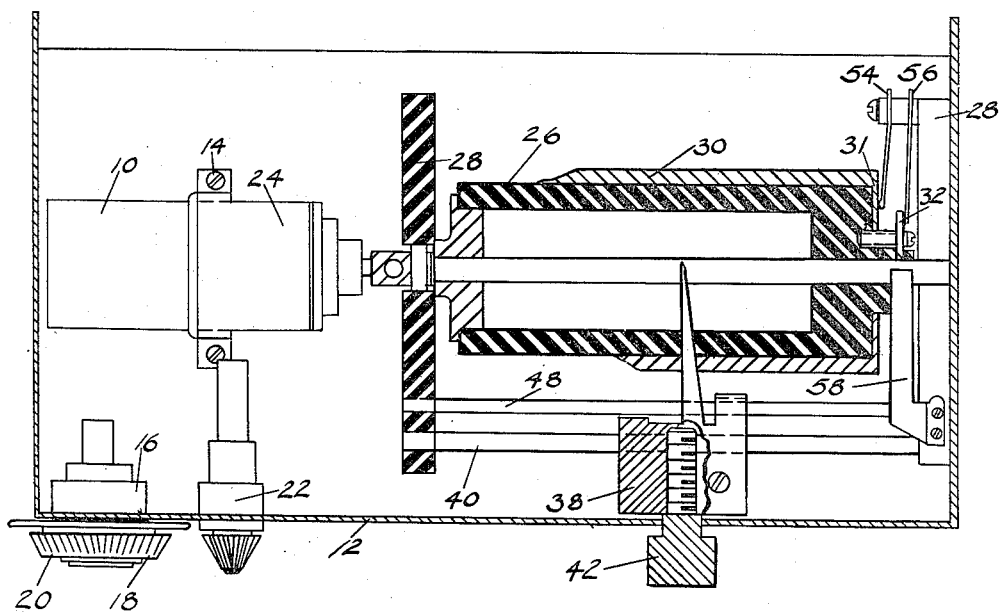
Figure 3:
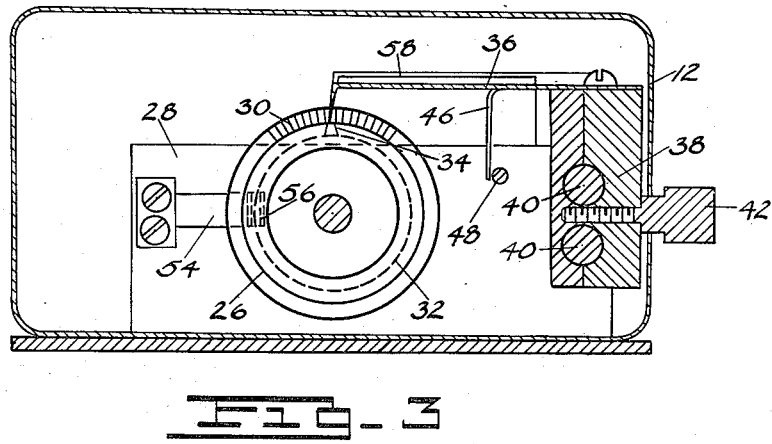

The motor 10 drives a gear train, indicated in block form at 24 (Figure 2), which in turn drives a cylindrical cam 26 journalled in insulating brackets 28 suitably secured to the casing 12. The cam 26 is made from a suitable insulating material such as Bakelite and is provided with a sheath 30 (Figures 2, 3 and 4) made from a suitable conducting material such as brass. The sheath 30 is symmetrical about the axis of the cylindrical cam 26 and has a width which increases logarithmically along its axis. At its right end, as seen in Figure 2, the sheath is provided with a sleeve portion 31 which completely envelopes the annular surface of the cam and which extends inwardly to cover the right face of the cam. A conductive disc 32 suitably separated from the sheath is carried on the cam 26 to the right of the sleeve portion 31. The disc has a nipple 34 positioned along the same axial line as that which divides the sheath 30 into two symmetrical portions.

A conductive arm 36 rides above the cam 26 for contact with the sheath 30 during each revolution of the cam. The arm 36 is secured as by screws to a slider 38 which is mounted on a pair of support rods 40 for movement along the rods, the rods in turn being supported by the brackets 28. The slider 38 is composed of two members which can be clamped together on the rods 40 by a screw 42 extending transversely through the members and the front panel of the casing 12. The slider 38 has a downwardly turned guide arm 46 (Figure 3) which presses on a guide rod 48 supported between the brackets 28, as the slider moves to the right or left in Figure 2 to adjust the axial position of the contact arm 36 relative to the cam 26. The slider also carries on the front of the casing 12 a scale 50 (Figure 1) logarithmically calibrated in a manner similar to the dial 20 to indicate the different rotational speeds of the motor 10. The scale 50 is disposed directly below a logarithmically calibrated scale 52 fixedly positioned on the front panel of the casing 12 as by screws. The scale 52 is calibrated in a manner which will be indicated in detail hereinafter.

A plurality of contact arms 54, 56 and 58 (Figures 2, 3 and 4) are suitably secured to the right bracket 28 in insulated relationship to one another. The arm 54 continuously contacts the sleeve portion 31 of the sheath 30 as the cam 26 rotates, and the arm 56 presses against the face of the disc 32 to maintain continuous electrical continuity with the disc as the disc rotates. The arms 54 and 56 are electrically grounded. The arm 58 is positioned above the disc 32 to establish contact with the nipple 34 on the disc for an instant during each revolution of the disc.

The apparatus disclosed above is associated with the photographic equipment shown in Figure 5. This equipment includes a camera 60 having a magazine 62 through which film is fed for exposure at a predetermined rate controlled by the positioning of a knob 64. The knob 64 is positioned in accordance with the determinations which will be explained in detail hereafter. The camera 60 and magazine 62 are contiguous to an oscilloscope 66 having a cathode ray tube 68, and the oscilloscope 66 is in turn positioned adjacent to a recorder 70 adapted to indicate on meters 72 data related to the information pictorially shown on the cathode ray tube of the oscilloscope 66.

A mirror 74 sufficiently silvered to reflect a fraction, such as 70%, of the light impinging on it and to pass the remainder of the light is positioned above the lens and shutter of the camera 60. The mirror 74 has a plane surface disposed at an angle of approximately 45° relative to the horizontal. A fully silvered mirror 76 is positioned directly above the cathode ray tube 68 and is provided with a plane reflecting surface which faces the mirror 74 at an angle approximately 45° to the horizontal. The mirrors 74 and 76 are connected by a shroud 78 to prevent any light other than that on the face of the cathode ray tube 68 from passing into the camera when a photograph is being taken of the picture on the face of the tube.

A lens 80 and a fully silvered mirror 82 are vertically aligned with the mirror 74 and the lens of the camera 60, the lens 80 being positioned between the mirrors 74 and 82. The mirror 82 has a reflecting surface parallel to that of the mirror 74. A fully silvered mirror 84 having a reflecting surface parallel to the reflecting surface of the mirror 76 is disposed vertically above the meters 72 in the data recorder 70 and in horizontal alignment with the mirror 82. A shroud 86 covers the mirror 74, the lens 80, the mirrors 82 and 84 and the data recorder 70 and shields them from any extraneous light. A flash tube 88 is supported on the chassis to illuminate the meters in the data recorder 70 whenever the recorder is energized.

The conductive arms 36, 54, 56 and 58, the oscilloscope 66 and the flash tube 88 are included in the circuit diagram shown in Figure 6. The circuit also includes a pulse generator 90 connected in a cascade arrangement with frequency dividers 92, 94 and 96. The output from each of the frequency dividers 92, 94 and 96 are introduced to the stationary contacts of a manually operated rotary switch 98 having its movable contact connected to the grid of the left tube in a monostable multivibrator 100 and to the contact 36 associated with the cam 24.

The plate of the left tube in the multivibrator 100 is connected to a grid in the oscilloscope 66, this grid controlling the intensity of the beam impinging on the face of the cathode ray tube shown in Figure 5. The oscilloscope deflector plates controlling the horizontal deflection of the beam in the cathode ray tube 68 receive signals from the output terminal of a saw tooth wave generator 102, the input terminal of which is connected to an output terminal of the pulse generator 90. The oscilloscope deflector plates controlling vertical deflection of the beam may receive signals from a receiver 104 and from the output terminal of a transmitter 105 triggered by the pulse generator 90.

The contact arm 58 is connected to the common terminal between a capacitance 106 and a resistance 108, which are in a series circuit including the primary winding of a transformer 110 and a suitable source of direct power, such as a battery 112. One side of the transformer primary winding and the negative terminal of the battery 112 are grounded. The secondary winding of the transformer 110 is connected between ground and the flash tube 88.

The apparatus disclosed above may be utilized in different applications to provide a permanent record of the information obtained. Thus, the pictures taken of the wave shapes on the oscilloscope 66 provide a permanent record of the shape of the pulses transmitted from a central station to a distant object and the shape of the pulses reflected by the distant object back to the central station. The time separation between the transmitted and received pulses as seen on the oscilloscope also provides an indication of the distance between the central station and the distant object. Similarly, the pictures taken of the meter readings in the data recorder 70 may indicate such parameters as atmospheric temperature and humidity and peak pulse power, all of which may affect the performance of the radar equipment.

The pulses are transmitted from the central station to the distant object at a predetermined frequency determined by the pulse generator 90. The pulses from the generator 90 are also converted into a sawtooth wave shape by the generator 102 and are applied to the horizontal plates of the cathode ray tube in the oscilloscope 66 to produce a linear deflection of the beam along the horizontal axis. At the same time, the pulses are reduced in frequency by the frequency dividers 92, 94 and 96 into convenient fractions—for example, $\frac{1}{10}$, $\frac{1}{20}$ and $\frac{1}{40}$ of the basic frequency, the operative reduction being determined by the position of the movable arm of the switch 98. Each signal passing through the switch 98 acts on the left tube in the multivibrator 100 to produce on the plate of the tube a positive pulse which is applied to the grid of the cathode ray tube controlling the intensity of the beam. This positive pulse is of sufficient magnitude to accelerate the beam to the face of the cathode ray tube.

Every time that the trace appears on the face of the cathode ray tube, it is reflected by the mirrors 76 and 74 (Figure 5) to the lens of the camera 60. The camera 60 acts to take a picture of each trace from the oscilloscope.

The pictures of the oscilloscope trace are taken during the time that the cam 26 is rotating through its insulated portion. During this time, no continuity is established between the contacts 36 and 54 so that the input terminal to the multivibrator 100 is not grounded. When the conductive sheath 30 rides under the contact arm 36, however, the input terminal to the multivibrator 100 becomes grounded through the arm 36, the sheath 30 and the contact arm 54 and prevents the multivibrator from being triggered by signals which pass through the frequency dividers 92, 94 and 96 from the pulse generator 90. As a result, no trace appears on the face of the cathode ray tube in the oscilloscope 66.

When approximately half of the sheath 30 has rotated past the contact arm 36, the nipple 34 engages the contact arm 58 and grounds the capacitance 106 through a circuit which includes the contact arm 58, the nipple 34, the disc 32 and the contact arm 56. The capacitance 106 has been previously charged through a circuit including the battery 112, the resistance 108, the capacitance and the primary winding of the transformer 110. Upon becoming grounded, the capacitance 106 discharges through substantially a short circuit path formed by the primary winding of the transformer 110 and produces a short and heavy current pulse. This induces a sufficient voltage in the secondary winding of the transformer 110 to break down the tube 88 and produce a flash of light in the tube. The light flash illuminates the faces of the meters in the data recorder 70 and causes the readings on the meters to be reflected by the mirrors 84 and 82 to the lens of the camera 60. Since no picture has been taken of the oscilloscope trace during the time that the sheath 30 is travelling under the contact 36, a sufficient footage of unexposed film is presented behind the lens to take a picture of the instrument readings when the tube 88 produces its light flash.

As previously disclosed, the rate at which pictures are taken of the oscilloscope trace may be varied by adjustment of the movable contact of the switch 98 and by a corresponding adjustment of the camera knob 64. In case an adjustment is made in the rate at which oscilloscope pictures are taken, the slide must be correspondingly adjusted in position if proper photographs are to be made of the readings on the meters 72. For example, only one oscilloscope trace out of ten may be initially illuminated for recording by the camera 60 (Figure 5), and the motor 10 (Figure 2) may be rotating at a speed indicated by the numeral "1" on the dial 20 (Figure 1). In such a case, the slide 38 may be positioned so that the numeral "1" on the scale 50 lies directly under the numeral "10" on the scale 52.

If it is desired to take only one oscilloscope picture out of every twenty traces, the movable contact of the switch 98 (Figure 5) is rotated to the appropriate stationary contact. The setting of the camera 60 is also appropriately varied to reduce the speed of the film so that only the necessary footage of film will be available for each picture in view of the reduced rate at which pictures will be taken. Because of the reduced rate at which the film now travels, the slide 38 is adjusted in position so that the numeral "1" on the scale 50 lies directly under the numeral "20" on the scale 52. This moves the sheath 30 to the right and causes the width of the sheath passing under the contact arm 36 to increase. By increasing the effective width of the sheath, compensation is provided for the reduced rate at which the film travels when only one oscilloscope trace out of twenty is photographed, and the amount of film available for a photograph of the readings on the meters 72 is maintained substantially constant. Furthermore, since no change has been made in the rate at which the cam 26 rotates, the rate at which pictures are taken of the readings on the meters 72 is maintained substantially constant.

In case it is desired to vary the rate at which instrument pictures are taken relatively to the rate at which oscilloscope pictures are taken, the speed of the motor 10 is varied by changing the setting of the potentiometer 18. At the same time, the position of the slide 38 is varied in accordance with the change in the speed of the motor 10. For example, the motor may be operating at a speed indicated by a setting of "1.0" on the potentiometer 18 and the camera may be photographing one out of every twenty oscilloscope traces. If it is desired to change the rate at which pictures are taken of the instrument readings without materially affecting the rate at which photographs are taken of the oscilloscope trace, the setting of the potentiometer may be changed from "1.0" to "2.0." The slide 38 may also be adjusted in position so that the numeral "2.0" on the scale 50, instead of the numeral "1.0," lies directly under the numeral "20" on the scale 52. This moves the sheath 30 to the right in Figure 2 and increases the effective width of the sheath as it passes under the contact arm 36. By increasing the effective width of the sheath, compensation is provided for its increased speed of rotation. This compensation causes the trace in the oscilloscope 66 to be blanked out for a substantially constant period of time before a picture is taken of the readings on the meter 72, regardless of the rate at which pictures of the meter readings are taken. In this way, a substantially constant footage of film is available for each picture of the meter readings.

Mathematically, the operation of the apparatus disclosed above may be proved as follows:

$$PPS = \frac{PRF}{CDR} \qquad (1)$$

where $PPS$ = the number of pictures taken per second of the oscilloscope trace by the camera 60;
$PRF$ = the number of times per second that the beam in the oscilloscope is horizontally swept; and
$CDR$ = the number of oscilloscope sweeps that are prevented from appearing on the face of the oscilloscope tube before one sweep finally appears.

In addition, $$F = (A)(PPS) \qquad (2)$$

where $F$ = the film speed per second; and
$A$ = the width of one picture of the oscilloscope trace.

Substituting Equation 1 in Equation 2:

$$F = \frac{(A)(PRF)}{CDR} \qquad (3)$$

As another relationship, $$T_1 = \frac{B}{F} \qquad (4)$$

where $T_1$ = the time required for the film to move sufficiently to take one photograph of the instrument readings; and
$B$ = the width of the film required to take one photograph of the instrument readings.

By substituting Equation 3 in Equation 4, the following relationship is obtained.

$$T_1 = \frac{(B)(CDR)}{(A)(PRF)} \qquad (5)$$

Another relationship can be given as follows:

$$R = (M)(T_1) \qquad (6)$$

where $R$ = the fraction in each revolution of the cam 24 during which the contact arm 36 establishes electrical continuity with the sheath 30; and
$M$ = the speed of the cam 24 in revolutions per second.

If Equation 5 is substituted in Equation 6, $$R = \frac{(M)(B)(CDR)}{(A)(PRF)} \qquad (7)$$

Because of the relationship expressed in Equation 1

$$R = (M)(B)/(A)(PPS) \qquad (8)$$

Since A and B can be considered constant for a given application $$R = \frac{(K)(M)}{(PPS)} \qquad (9)$$

where $K$ = a constant. Or $$\text{Log } R = \log K + \log (M) - \log (PPS) \qquad (10)$$

Figure 4:
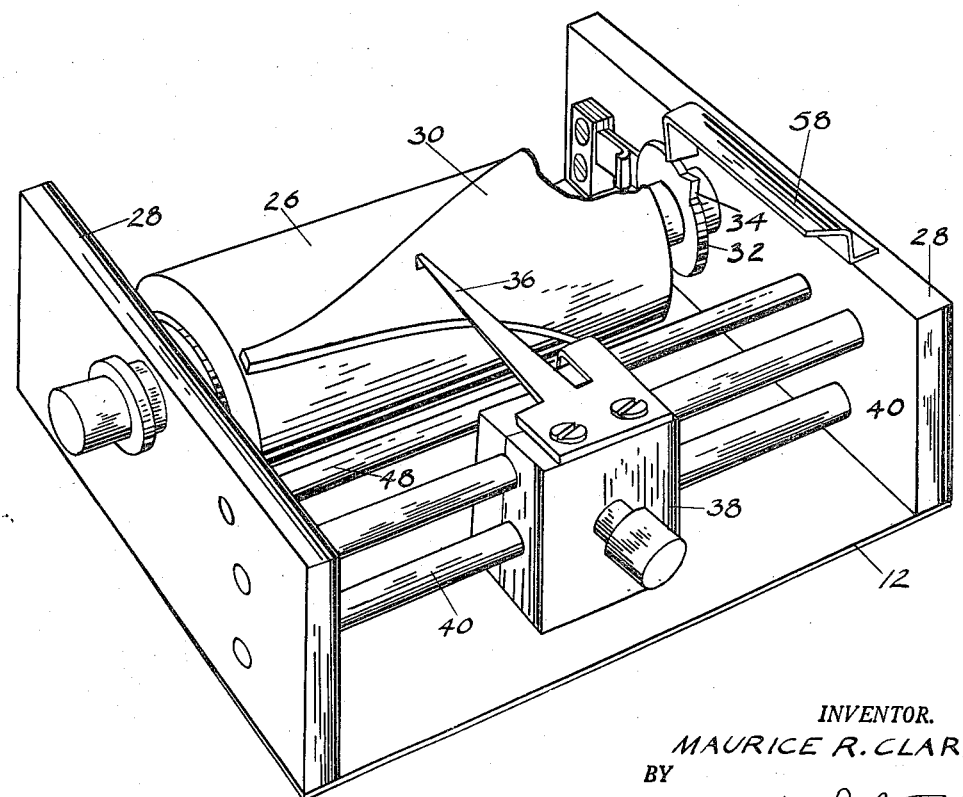
Figure 4 is a perspective view of some of the important components shown in the previous figures, as seen from a position in front of and to the left of the components.

The logarithmic relationship expressed in Equation 10 is the equation that is solved by properly setting the scale 50 relative to the scale 52. The scales 50 and 52 and the axial contour of the sheath 30 are all calibrated logarithmically in order to keep the width of the sheath 30 relatively small at the right end of the sheath as seen in Figure 4 and in order to meet the requirements of Equation 10.

The apparatus disclosed above has several important advantages. It is able to adjust the rate at which pictures are taken of a phenomenon, such as an oscilloscope trace, independently of the rate at which pictures are taken of parameters related to the phenomenon, such as instrument readings of atmospheric temperature and humidity. The apparatus is also able to adjust the rate at which pictures are taken of the parameters without materially altering the rate at which pictures are taken of the phenomenon itself. Because of its logarithmic calibration, the apparatus is capable of taking pictures of the phenomenon and its related parameters over wide ranges of rates. Furthermore, the apparatus operates to prevent any photographic appearance of the parameters during the time that pictures are taken of the phenomenon and vice versa. The apparatus is simple and sturdy in construction and reliable in operation.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A timer for a camera, including, means for presenting a phenomenon in visual form for photography, means for adjusting the rate at which the phenomenon is presented for photography, a camera, means in the camera for adjusting the camera to take pictures of the phenomenon at the rate of presentation of the phenomenon for photography, a motor, a cam driven by the motor and operative during a predetermined portion of each cycle of rotation to blank out any presentation of the phenomenon, means for providing in visual form information related to the phenomenon, and means associated with the cam and operative at an intermediate interval in the blanking period to present for photography the information relating to the phenomenon.

2. A timer for a camera, including, means for presenting a phenomenon for photography at a particular rate, means for adjusting the rate at which the phenomenon is presented for photography, a camera for taking pictures of the phenomenon, a cylindrical cam having a conductive portion varying in width along the axis of the cylinder, means for varying the effective width of the conductive portion in accordance with the rate at which the phenomenon is presented for photography, means associated with the first mentioned means and with the cam for blanking out any presentation of the phenomenon during the rotation of the cam through its conductive portion, means for providing in visual form information related to the phenomenon, and means associated with the cam for presenting for photography the information related to the phenomenon during the rotation of the cam through its conductive portion.

3. A timer for a camera, including, means for presenting a phenomenon for photography at a particular rate, means for adjusing the rate at which the phenomenon is presented for photography, a camera for taking pictures of the phenomenon at the rate of presentation of the phenomenon, a cylindrical cam having a conductive portion varying logarithmically in width along the axis of the cylinder, a motor for driving the cam, means for varying the speed of the motor to vary the rate at which the conductive portion rotates, a conductive arm adapted to make contact with the conductive portion of the cam, means for varying the width of the conductive portion of the cam making contact with the arm in accordance with the rate at which the phenomenon is presented for photography and in accordance with the speed of the motor, means associated with the first mentioned means and the cam for blanking out any presentation of the phenomenon during contact between the arm and the conductive portion of the cam, means for providing visual information related to the phenomenon, and means associated with the cam for presenting for photography the information related to the phenomenon during the rotation of the cam through the arc in which the conductive portion makes contact with the arm.

4. A timer for a camera, including, a cylindrical cam having a conductive portion increasing gradually in width along the axial length of the cam, a switch associated with the cam for closure during the rotation of the cam through its noncondutive portion, means operative to present a phenomenon for photography at a predetermined rate during the rotation of the cam through its nonconductive portion, a camera for taking pictures of the phenomenon at the rate of presentation of the phenomenon, during the rotation of the cam through its non-conductive portion, means for providing visual information related to the phenomenon, and means associated with the cam and operative during the rotation of the cam through its conductive portion to present for photography the information related to the phenomenon.

5. A timer for a camera, including, a cylindrical cam having a conductive portion increasing gradually in width along the axial length of the cam, an adjustable conductive arm adapted to make contact with the conductive portion of the cam to form a closed switch, means associated with the switch for presenting a phenomenon for photography at a predetermined rate during the time that the switch is not closed, means associated with the cam for adjusting the position of the arm relative to the axial length of the cam in accordance with the rate at which the phenomenon is presented for photography, a camera for taking pictures of the phenomenon, means for adjusting the camera to take pictures of the phenomenon at the rate of presentation of the phenomenon, means for providing in visual form information related to the phenomenon, and means including a second switch associated with the cam and operative during the closure of the switch to present for photography the information related to the phenomenon.

6. A timer for a camera, including, a cylindrical cam having a conductive portion increasing gradually in width along the axial length of the cam, an adjustable conductive arm adapted to make contact with the conductive portion of the cam to form a closed switch, means operative to present a phenomenon for photography at a predetermined rate during the time that the switch is not closed, means for varying the speed of rotation of the cam so as to vary the frequency at which the switch opens relative to the rate at which the phenomenon is presented for photography, means for adjusting the position of the conductive arm relative to the axial length of the cam in accordance with the rate at which the phenomenon is prepared for presentation and in accordance with the rotational speed of the cam, a camera, means for adjusting the camera to take pictures of the phenomenon at the rate of presentation of the phenomenon for photography, means for providing in visual form information related to the phenomenon and means associated with the cam and operative during the closure of the switch to present for photography the information related to the phenomenon.

7. A timer for a camera, including, a cylindrical cam having a conductive portion increasing gradually in width along the axial length of the cam, a conductive arm axially adjustable in position relative to the cam and adapted to make contact with the conductive portion of the cam to form a closed switch, means operative to present a phenomenon for photography at a particular rate, a camera for taking pictures of the phenomenon, means for adjusting the camera to take pictures of the phenomenon at the rate of presentation of the phenomenon, means for varying the rotational speed of the cam to adjust the frequency at which the switch is closed relative to the rate at which the phenomenon is presented for photography, a first scale calibrated to provide an indication of the different rates at which the phenomenon may be presented for photography, a second scale movable with the conductive arm and axially adjustable in position relative to the first scale, the second scale being calibrated in accordance with the different speeds at which the cam may rotate, means for providing in visual form information related to the phenomenon, and electrical circuitry associated with the cam and the cam switch for blanking out any photographic presentation of the phenomenon during the closure of the switch and for presenting the information related to the phenomenon for photography during such switch closure.

8. A timer for a camera, including, electrical means for presenting a phenomenon for photography at a predetermined rate, a camera for taking pictures of the phenomenon, means for adjusting the camera to take pictures of the phenomenon at the rate of presentation of the phenomenon, a cam, means for driving the cam at varying speeds, switching means associated with the cam and the electrical means for blanking out any presentation of the phenomenon for a predetermined period during each revolution of the cam, means for providing in visual form information related to the phenomenon and means associated with the cam and operative during the period that the phenomenon is blanked out to present for photography the information related to the phenomenon.

9. A timer for a camera, including, electrical means for presenting a phenomenon in visual form for photography, an electrical circuit including a monostable stage associated with the visual means to control the rate at which the monostable stage is activated, means for energizing the first mentioned means for the presentation of the phenomenon in visual form upon each activation of the monostable stage, a camera for taking pictures of the phenomenon, means for adjusting the camera to take pictures of the phenomenon at the rate at which the first mentioned means presents the phenomenon in visual form, a cam, a motor for driving the cam at varying speeds, switching means associated with the cam and the electrical circuit for blanking out any presentation of the phenomenon in visual form after a predetermined number of pictures have been taken of the phenomenon, means for providing in visual form information related to the phenomenon and means associated with the cam and operative during the period that the phenomenon is blanked out to present to the camera for photography the information related to the phenomenon.

10. A timer for a camera, including, electrical means for receiving a phenomenon and for presenting the phenomenon in visual form at a particular rate, a camera for taking pictures of the phenomenon, means for controlling the camera to take pictures of the phenomenon at the rate that the phenomenon is presented in visual form, a cylindrical cam having a conductive portion along its axial length, means for rotating the cam, a first conductive arm adapted to make contact with the conductive portion of the cam as the cam rotates, electrical mans for blanking out any presentation of the phenomenon in visual form during contact between the first arm and the conductive portion of the cam, a disc adapted to rotate with the cam and having a conductive nipple extending from its periphery, a second conductive arm adapted to make contact with the nipple as the cam rotates through its conductive portion, means for providing in visual form information related to the phenomenon and electrical means for presenting to the camera for photography the information related to the phenomenon upon the establishment of contact between the second arm and the conductive nipple.

11. A timer for a camera, including, electrical means for presenting a phenomenon in visual form for photography, an electrical circuit associated with the first mentioned means for activating the first mentioned means at a predetermined rate so as to present the phenomenon in visual form at the predetermined rate, a camera for taking pictures of the phenomenon, means in the camera for adjusting the rate at which pictures are taken in accordance with the rate at which the phenomenon is presented in visual form, a cylindrical cam having a conductive portion varying in width along the axis of the cylinder, means for varying the effective width of the conductive portion in accordance with the rate at which the phenomenon is presented in visual form, means associated with the cam and the electrical circuit for rendering the first mentioned means inactive during the rotation of the cam through its conductive portion so as to blank out any presentation of the phenomenon in visual form, means for providing visual data related to the phenomenon and an electrical circuit associated with the cam and operative during the rotation of the cam through its conductive portion to present to the camera for photography the data related to the phenomenon.

12. A timer for a camera, including, a cylindrical cam having a conductive portion increasing in width along the axial length of the cam, means for varying the speed of rotation of the cam, a first conductive arm movable axially along the length of the cam and adapted to make contact with the conductive portion of the cam as the cam rotates through its conductive portion, a driven member attached to the cam and adapted to rotate at the same speed as the cam, a conductive lug extending from the driven member, a second conductive arm adapted to make contact with the lug as the cam rotates through an intermediate interval of its conductive portion, electrical means for presenting a phenomenon in visual form for photography, a camera for taking pictures of the phenomenon, means for adjusting the camera to take pictures of the phenomenon at the rate at which the phenomenon is presented for photography, means for providing an adjustment of the position of the first conductive arm relative to the axial length of the cam in accordance with the rate at which the phenomenon is presented for photography, an electrical circuit associated with the cam and the electrical means to blank out any presentation of the phenomenon for photography during contact of the first conductive arm and the conductive portion of the cam, means for providing in visual form data related to the phenomenon, and an electrical circuit operative upon the establishment of contact between the second conductive arm and the conductive lug to present for photography the data related to the phenomenon.

13. A timer for a camera, including, electrical means for presenting a phenomenon in visual form for photography, an electrical circuit associated with the first mentioned means to adjust the rate at which the phenomenon is presented in visual form for photography, a camera for taking pictures of the phenomenon, means for adjusting the camera to take pictures of the phenomenon at the rate at which the phenomenon is presented by the first mentioned means for photography, a cylindrical cam having a conductive portion varying logarithmically in width along the axis of the cylinder, a motor for driving the cam at varying speeds, a first conductive arm adapted to make contact with the conductive portion of the cam, means for varying the axial position of the conductive arm relative to the cam in accordance with the rate at which photographs are taken of the phenomenon and in accordance with the speed of the cam, means for blanking out the first mentioned means during contact of the first conductive arm and the conductive portion of the cam, a driven member attached to the cam and adapted to rotate with the cam, a conductive lug projecting from the periphery of the driven member, a second conductive arm adapted to make contact with the lug during rotation of the cam through its conductive portion, means for providing in visual form information related to the phenomenon, and means for presenting for photography the information related to the phenomenon during contact of the second conductive arm and the lug.

14. A timer for a camera, including, electrical means including a plurality of divider stages and a monostable stage for adjusting the rate at which the monostable stage is activated, means for presenting a phenomenon in visual form for photography upon each activation of the monostable stage, a camera for taking pictures, means for adjusting the camera to take pictures of the phenomenon each time that the phenomenon is presented in visual form, a cylindrical cam, a motor for driving the cam, means for varying the speed of the motor to vary the rate at which the cam rotates, switching means associated with the cam and the electrical means, the switching means being operative after a predetermined number of pictures have been taken of the phenomenon to blank out any presentation of the phenomenon in visual form, means for presenting in visual form other information related to the phenomenon, and an electrical circuit associated with the cam and operative during the blanking period to present for photography the information related to the phenomenon.

15. A timer for a camera, including, a cylindrical cam having a non-conductive portion and having a conductive portion increasing in width along the axial length of the cam, electrical means associated with the cam and operative during rotation of the cam through its non-conductive portion for presenting a phenomenon in visual form for photography at a predetermined rate, a camera for taking pictures, means for adjusting the camera to take pictures of the phenomenon at the rate the phenomenon is presented in visual form, switching means associated with the conductive portion of the cam and the electrical means, the switching means being operative upon the electrical means during the rotation of the cam through its conductive portion to blank out any presentation of the phenomenon in visual form for photography, means for providing in visual form other information related to the phenomenon, and an electrical circuit associated with the cam and operative at an intermediate interval in the blanking period to present to the camera for photography the information related to the phenomenon.

References Cited in the file of this patent
UNITED STATES PATENTS

| | | |
|---|---|---|
| 1,813,780 | Tuttle | July 7, 1931 |
| 1,814,424 | Barr | July 14, 1931 |
| 2,047,983 | Richards | July 21, 1936 |
| 2,401,530 | Vought | June 4, 1946 |
| 2,406,152 | Levine | Aug. 20, 1946 |
| 2,428,369 | Kammer | Oct. 7, 1947 |
| 2,521,734 | Lilienfeld | Sept. 12, 1950 |